Dec. 25, 1956   J. HALLER   2,775,375
DISPENSING DEVICE
Filed Nov. 23, 1953
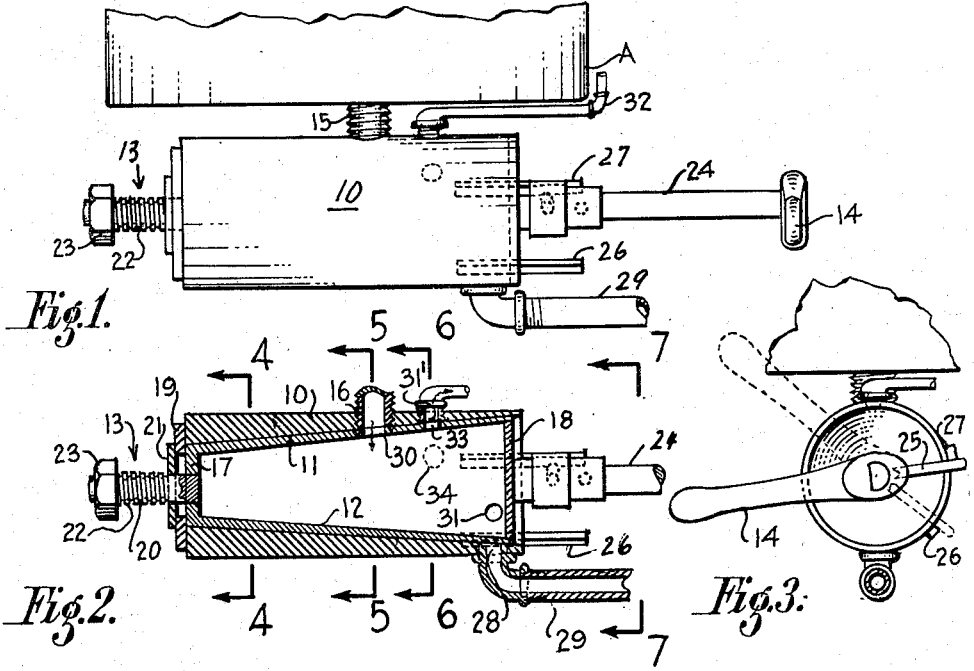
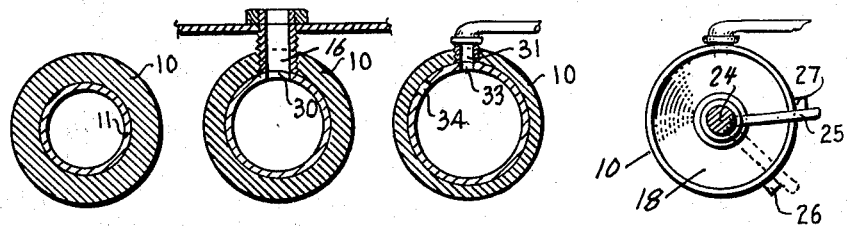
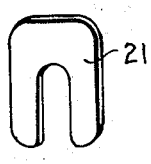 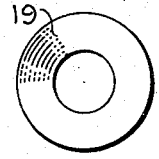
Fig.8.   Fig.9.
INVENTOR.
Jacob Haller
BY
A. Schapp
ATTORNEY

United States Patent Office 2,775,375
Patented Dec. 25, 1956

2,775,375

DISPENSING DEVICE

Jacob Haller, San Francisco, Calif.

Application November 23, 1953, Serial No. 393,681

2 Claims. (Cl. 222—362)

The present invention relates to improvements in dispensing devices, and its principal object is to provide a device for dispensing liquid from a large container in limited, measured amounts.

My invention is principally intended for the dispensing of liquid coffee or soft drinks from containers which may hold a number of gallons, in smaller quantities, sufficient to fill a drinking cup or glass, the quantity being measured for each dispensing operation.

More particularly it is contemplated to provide a dispensing device in the form of a valve, in which the movable valve member itself serves as a measuring device and is designed to receive a desired amount of liquid when in one position and to discharge the said amount when in another position.

It is further proposed to provide a dispensing device which is simple in construction, effective in operation, sanitary, which may be suspended from the bottom of the main container or mounted within the latter, is operated by a slight turn of a handle through a limited angle, and readily lends itself to coin control, if desired.

Further objects and advantages of my invention will appear as the specification continues, and the new and useful features of my dispensing device will be fully defined in the claims hereto attached.

The preferred form of the invention is illustrated in the accompanying drawing forming part of this application, in which:

Figure 1 shows a side view of my dispensing device, as suspended from a liquid container;

Figure 2, a vertical, axial section through the dispensing device;

Figure 3, an end view, as seen from the right-hand side;

Figure 4, a section taken along line 4—4 of Figure 2;

Figure 5, a section taken along line 5—5 of Figure 2;

Figure 6, a section taken along line 6—6 of Figure 2;

Figure 7, a section taken along line 7—7 of Figure 2; and

Figures 8 and 9, detail views of washers used in the assembly of my device.

While I have shown only the preferred form of my invention, I wish to have it understood that various changes or modifications may be made within the scope of the claims hereto attached, without departing from the spirit of the invention.

Referring to the drawing in detail, my invention comprises in its principal parts, a cylindrical housing 10 having a frusto-conical bore, as at 11, a frusto-conical, hollow valve member 12 fitting in the bore and revolvable therein, means shown at 13 for interlocking the cylinder and the valve member, a handle 14 for operating the valve member, means for limiting the rotary movement of the latter member and suitable portions positioned to allow of valve filling and dispensing operations and of venting during said operations.

The housing 10 is in the form of an elongated cylinder open at both ends and formed with a conical or tapered inner face which extends from end to end. It is suspended, in the form shown, from the container or tank A, substantially midway its length, by a conduit 15 which connects with the intake conduit 16 of the housing.

The cylinder thus occupies a horizontal position underneath the tank, but also may be mounted within the tank, immediately above the floor thereof, with the intake port opening directly into the tank.

The valve member 12 has an outer taper fitting the taper of the housing and is of substantially the same length as the housing, so as to extend through the same from end to end and to form a liquid-tight bearing therewith. Both ends of the valve member are closed, as at 17 and 18, and the valve member is hollow throughout, with the inner wall faces running parallel to the outer wall faces, the valve member being designed and proportioned to hold a limited, measured amount of liquid, having the capacity of a drinking cup or glass.

When the valve member is fully inserted, to form a liquid-tight seal, its inner end 17 registers with the corresponding end of the housing, as shown, and a sealing ring 19 is made to overlie the joint between the faces. The valve member is held in this position under tension by means of a threaded stud 20 projecting axially from the valve member, a U-shaped washer 21 straddling the stud and bearing on the sealing ring, a coiled spring 22 surrounding the stud, and a nut 23 threaded on the end of the stud and causing the spring to exert adjustable pressure on the slotted washer and the sealing ring.

The outer end 18 of the valve member has a stem 24 projecting axially therefrom, the stem carrying the handle 14 by means of which the valve member may be rotated.

Rotary movement of the valve is limited to a relatively small angle by means of an arm 25 projecting from the stem and engaging with either one of two stop members 26—27 projecting from the housing.

The housing has an outlet port 28 in the bottom thereof, near the outer end 18, that is, at the large end of the conical valve member, so that all the liquid may escape from the latter when the valve is in discharge position. An outlet conduit 29 connects with the port 28.

The valve member has an intake port 30 which registers with the intake port 16 of the housing when the handle 14 is in the full line position of Figure 3. The valve member also has an outlet port 31 in the transverse plane of the outlet port 28 and adapted to register therewith when the handle 14 is swung into the dotted line position shown in Figure 3, which movement throws the intake port 30 out of registry with the port 16. The handle cannot be thrown beyond either of the end positions on account of the stops 26—27.

The housing has a vent opening 31 connected to a vent conduit 32 which leads to an elevation above the liquid level in the tank, and the valve member has two corresponding vent openings 33 and 34, which are made to register with the vent opening in the housing, one in the filling position of the valve member and the other in its discharge position.

In operation, with the tank filled with liquid to be dispensed and the valve member in the position shown, the valve member will be filled to its capacity, the outlet being closed. When the handle 14 is turned to the dotted-line position, the intake valve will be closed and the outlet will be opened for discharge of the measured amount of liquid through the outlet tube 29 into a cup or glass held underneath its discharge end.

The valve member is held in operative position by the spring 22, which at the same time presses the sealing ring 19 upon the joint between the housing and the valve member. The latter may be readily withdrawn through the open outer end of the housing upon removal of the nut 23, for cleaning and repair purposes.

I claim:
1. In a dispensing device, a cylindrical housing having a conical bore and having axially spaced and diametrically opposed ports in the wall thereof, means for horizontally supporting the housing, with one of the ports presented upwardly to form an intake and the other port presented downwardly to form an outlet, means for admitting a liquid to the intake port, and a hollow valve member adapted for holding a measured quantity of liquid and having a conical wall dimensioned to have a revolving fit in the housing and having intake and outlet ports adapted for selective registering with the corresponding ports in the housing, means for rotating said valve between receiving and dispensing positions for alternate filling and dispensing operations, one end of the valve member being flush with the corresponding end of the housing so as to form an annular joint therewith, a sealing ring covering said joint, and spring means urging the sealing ring upon the end of the housing and the end of the valve upon the sealing ring, said spring means comprising a threaded stud projecting axially from said end of the valve, a U-shaped washer straddling the stud and bearing on the sealing ring, a coiled spring surrounding the stud and bearing on the washer, and a nut threaded on the stud and bearing on the spring.

2. The structure defined in claim 1 wherein a vent is provided in said housing and said valve member is provided with a pair of vent openings in a common transverse plane, one of said vent openings registering with said vent when the valve member is in filling position, and the other of said vent openings registering with said vent when the valve member is in dispensing position and being opposite the exhaust port in a plane extending substantially diametrically through the exhaust port.

References Cited in the file of this patent

UNITED STATES PATENTS

| | | |
|---|---|---|
| 368,545 | Muller | Aug. 16, 1887 |
| 397,854 | Green et al. | Feb. 12, 1889 |
| 474,343 | Oakley | May 3, 1892 |
| 844,065 | Wares et al. | Feb. 12, 1907 |
| 874,757 | Fox | Dec. 24, 1907 |
| 1,145,221 | Tobriner | July 6, 1915 |
| 2,037,500 | Cooper | Apr. 14, 1936 |

FOREIGN PATENTS

| | | |
|---|---|---|
| 9,633 | Australia | Oct. 12, 1932 |